(12) United States Patent
Gilad

(10) Patent No.: US 8,886,026 B2
(45) Date of Patent: Nov. 11, 2014

(54) ADJUSTABLE ELECTRIC HEATING MAT

(76) Inventor: Ofir Gilad, Kiryat Bialik (IL)

(*) Notice: Subject to any disclaimer, the term of this patent is extended or adjusted under 35 U.S.C. 154(b) by 174 days.

(21) Appl. No.: 13/641,232

(22) PCT Filed: Apr. 14, 2011

(86) PCT No.: PCT/IL2011/000309
§ 371 (c)(1),
(2), (4) Date: Oct. 15, 2012

(87) PCT Pub. No.: WO2011/128899
PCT Pub. Date: Oct. 20, 2011

(65) Prior Publication Data
US 2013/0034343 A1 Feb. 7, 2013

Related U.S. Application Data

(60) Provisional application No. 61/324,329, filed on Apr. 15, 2010.

(51) Int. Cl.
*H05B 3/20* (2006.01)
*F24D 19/02* (2006.01)
*F24D 13/02* (2006.01)
*H05B 3/34* (2006.01)

(52) U.S. Cl.
CPC .......... *H05B 3/34* (2013.01); *H05B 2203/002* (2013.01); *F24D 13/024* (2013.01); *H05B 2203/026* (2013.01); *H05B 2203/032* (2013.01)
USPC ............................ 392/432; 392/435; 219/528

(58) Field of Classification Search
None
See application file for complete search history.

(56) References Cited

U.S. PATENT DOCUMENTS

| | | | | |
|---|---|---|---|---|
| 2,522,841 A * | 9/1950 | Ross | ............................. | 392/435 |
| 2,889,439 A * | 6/1959 | Musgrave | ..................... | 392/435 |
| 4,032,751 A * | 6/1977 | Youtsey et al. | ............... | 219/538 |
| 4,474,841 A * | 10/1984 | Kerekes | ......................... | 428/78 |
| 4,485,297 A * | 11/1984 | Grise et al. | .................... | 219/528 |
| 4,937,435 A * | 6/1990 | Goss et al. | .................... | 219/528 |
| 5,577,554 A * | 11/1996 | Umina | ............................ | 165/53 |
| 5,788,152 A * | 8/1998 | Alsberg | ......................... | 237/69 |
| 5,908,573 A * | 6/1999 | Chiles et al. | .................. | 219/545 |
| 6,184,496 B1 * | 2/2001 | Pearce | .......................... | 219/213 |
| 6,943,320 B1 * | 9/2005 | Bavett | ............................ | 219/213 |
| 7,193,179 B2 * | 3/2007 | Horvath et al. | ............... | 219/212 |
| 7,193,191 B2 * | 3/2007 | Horvath et al. | ............... | 219/529 |
| 7,880,121 B2 * | 2/2011 | Naylor | .......................... | 219/213 |
| 8,306,408 B2 * | 11/2012 | Abbott | .......................... | 392/407 |

FOREIGN PATENT DOCUMENTS

| | | |
|---|---|---|
| JP | 2003041749 A | 2/2003 |
| JP | 2003239512 A | 8/2003 |
| WO | 2007023493 A2 | 3/2007 |

* cited by examiner

*Primary Examiner* — Thor Campbell
(74) *Attorney, Agent, or Firm* — William H. Dippert; Eckert Seamans Cherin & Mellott, LLC

(57) ABSTRACT

Electrical mats for generating heat, light or IR radiation which may be cut, drilled or trimmed and maintain their function. The mat is made of at least two sets of non-parallel electrodes of different polarities wherein electrodes of same polarities are connected to each other, but isolated from electrodes of different polarities; and a plurality of electrical elements connected to the electrode of different polarity and generating heat, radiation or light. The mats may be in the form of tiles, strips or tubes and may be used to tile 2D or 3D structures. The mats may also include cover layer or thermal isolation. Mats may be formed by deposition on a substrate or woven as fabric.

27 Claims, 12 Drawing Sheets

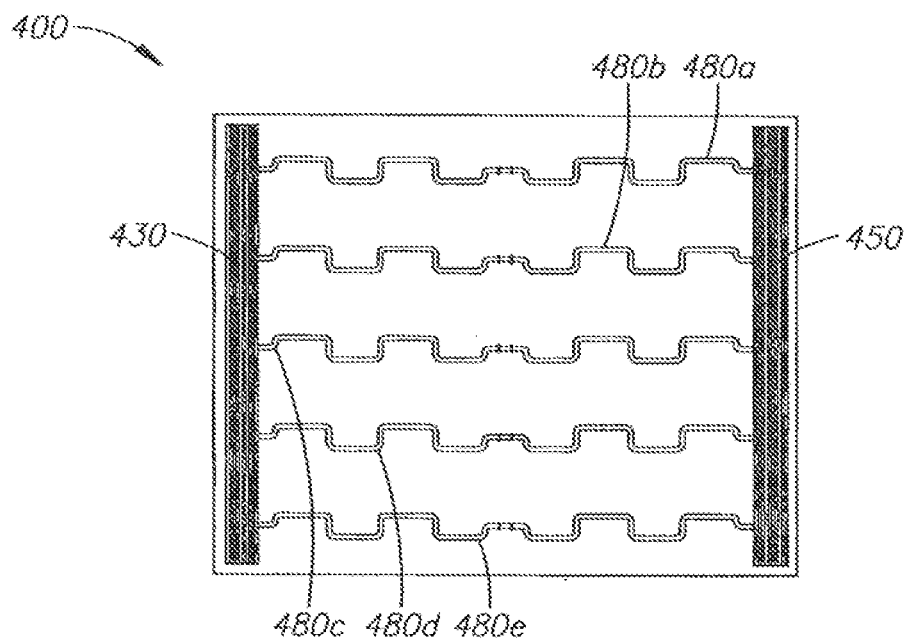
FIG.4A (ART)
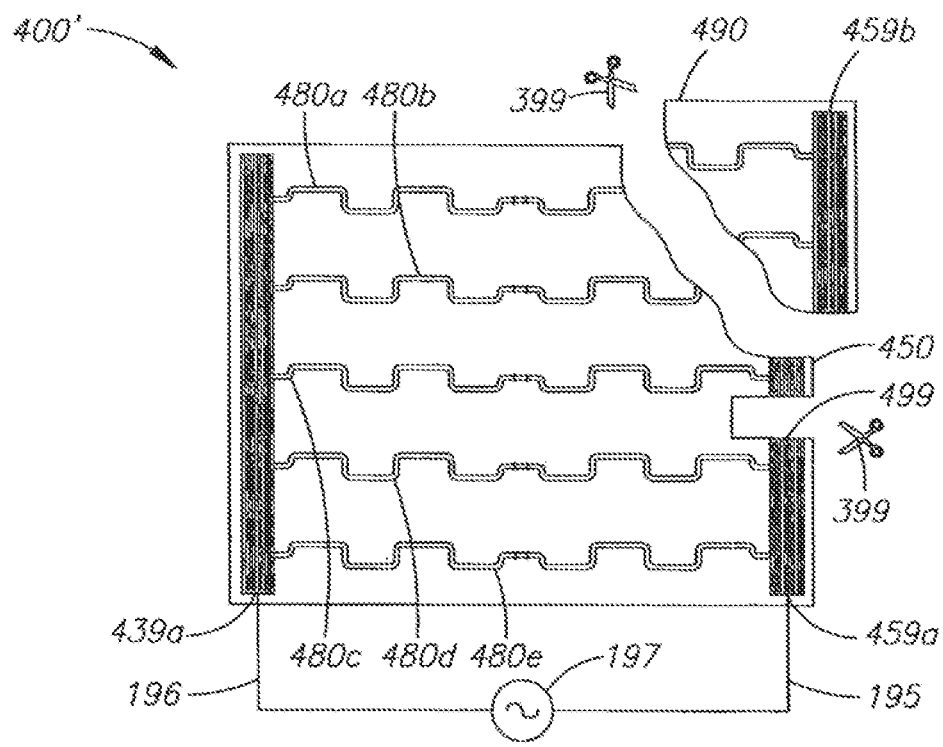
FIG.4B (ART)

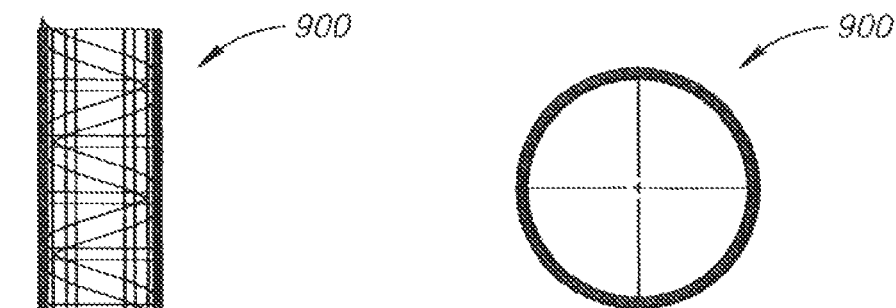
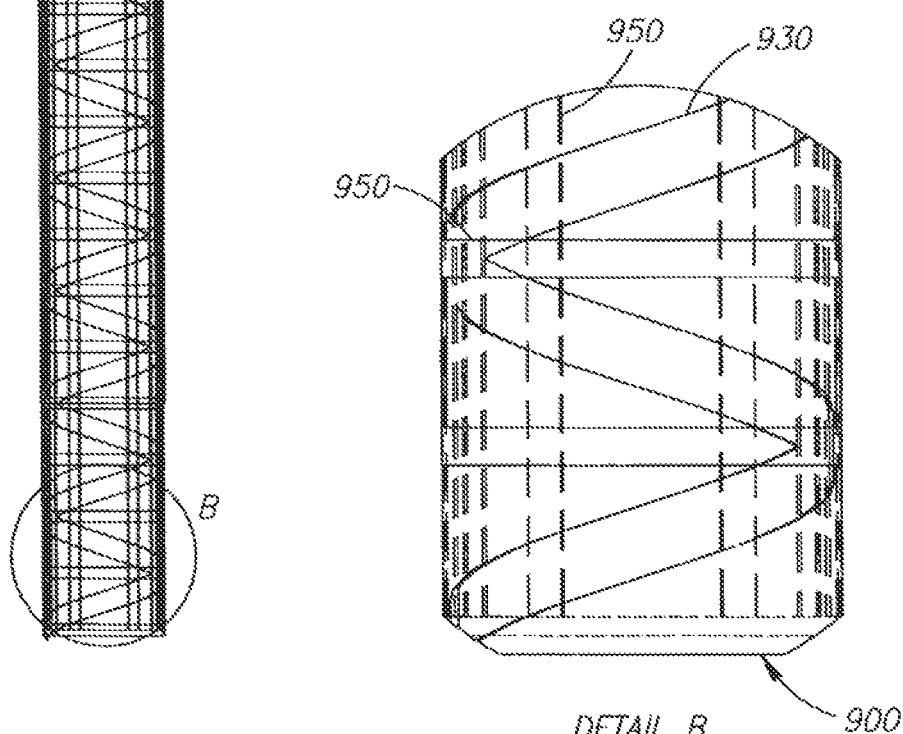
FIG.9B
FIG.9A
DETAIL B
FIG.9C

ADJUSTABLE ELECTRIC HEATING MAT

CROSS-REFERENCE TO RELATED APPLICATIONS

This patent application is a U.S. National Phase filing of International Patent Application No. PCT/IL2001/000309, filed Apr. 14, 2011, which is based upon and claims the benefit of the filing date of U.S. Provisional Patent application Ser. No. 61/324,329, filed Apr. 15, 2010, both of which are incorporated herein by reference.

FIELD OF THE INVENTION

The present invention relates to heating. In particular, the invention relates to creating complex-shaped heating surfaces.

BACKGROUND OF THE INVENTION

Underfloor heating is a form of central heating which achieves indoor climate control through thermal conduction alongside convection forced or natural air movement.

Underfloor heating systems were common even in ancient Roman times, when hypocausts were used for underfloor heating of public baths and private houses. The floor was raised above the ground by pillars, and a furnace was placed underneath the floor. Spaces were left inside the walls to allow hot air and smoke to pass through these enclosed areas and out of flues in the roof, thereby heating but not polluting the interior of the room. Ceramic box tiles were placed inside the walls to heat the walls.

Modern underfloor heating systems may be broadly divided into two types, namely warm water systems ("wet" systems) and electric systems.

Warm water systems may be expensive to install but relatively economical to use in the long run. By employing full lengths of piping without any joints, wet underfloor heating loops are practically maintenance free. When constructed from reliable materials, piping used can have a very long lifespan. This is critical, as repairing such mechanisms is typically complex and expensive. However in the event of failure, maintenance of water systems is typically very costly.

Electric underfloor heating systems benefit from simpler and quicker installation. Additionally, warm up times are generally a lot quicker than "wet" systems because the heating elements may be installed directly below the finished flooring making it a direct acting heat source rather than a storage heater. Another advantage of electric underfloor heating over a warm-water system is the floor build up/height. Floor build up can be as little as 1 mm. The electric cables are usually installed onto an insulation board or directly onto the subfloor or padding (under a carpet or laminate); then the floor covering is placed directly over the heating system or thinset.

Both wet and electric heating systems need to be fitted to the surface upon which they rest before they can be used. In wet systems, water pipes must be placed under the flooring typically during the construction of the floor. Electric underfloor heating systems are typically applied to the flooring as prefabricated heating mats. The classic configuration of such heating mats comprises two parallel electrodes with conducting heating elements extending therebetween. Cutting such a prefabricated heating mat for the purpose of fitting it into a complex shaped room will typically involve cutting the electrodes, thus resulting in detachment of a group of heating elements from their power source. Therefore, such prefabricated mats cannot typically be adjusted to fit inside complex shaped rooms, because cutting a heating mat may result in interruption of electric connectivity to parts of the mat.

The need remains therefore, for an electric underfloor heating mat that can be adjusted to fit inside a complex-shaped room without affecting electric connectivity of the heating elements. Embodiments described hereinbelow address this need.

SUMMARY OF THE INVENTION

An electrical heating mat is disclosed, the mat comprising a substrate at least two sets of non-parallel electrodes of different polarities deposited on the substrate, and a plurality of heating elements deposited on the substrate. In the heating mat, electrodes of same polarities are electrically connected to each other, and electrodes of different polarities are electrically isolated from each other and cross each other in at least one crossing point. The heating elements are connected to at least two electrodes of different polarities such that voltage applied between electrodes of different polarities creates an electrical current in the heating elements.

Optionally, the electrodes and the heating elements are patterned to generate substantially uniform heat over the surface of the substrate when voltage is applied between electrodes of different polarities.

Optionally, the electrodes and heating elements are patterned such that the mat may be substantially cut or trimmed, and the heating elements still generate substantially uniform heat over the remaining surface of the cut or trimmed substrate when voltage is applied between the electrodes of different polarities. Optionally, the electrodes and the heating elements are patterned in a form of repeated array.

In some embodiments, the electrodes and the heating elements are patterned in a form of a repeated one-dimensional array such that the mat is in a form of an elongated strip having a first and a second narrow edges and a first and a second broad edges. Optionally, the elongated strip is capable of receiving electrical power sufficient for its operation from electrodes located on the first narrow edge. Optionally, the elongated strip is capable of transmitting electrical power to another such elongated strip from its second narrow edge. Optionally, the elongated strip is capable of transmitting electrical power to another such elongated strip from any of the broad edges.

In some embodiments, the substrate is in a form of an elongated tube having a first and a second ends. Optionally, the elongated tube is capable of receiving electrical power sufficient for its operation from electrodes located on the first narrow edge. In some embodiments, the electrodes and the heating elements are patterned in a form of repeated two-dimensional array.

In some embodiments, the substrate comprises a rim, and is in forms that can tile a flat surface, and the electrodes of different polarities are exposed at the rim of the substrate. Optionally, the mat is capable of being abutted to an adjacent heating mat and receive electrical power from the adjacent heating mat.

In some embodiments, the substrate comprises a rim, and is in forms that can tile a surface of a three-dimensional structure such that the electrodes of different polarities are exposed at the rim of the substrate. Optionally, the mat is capable of being abutted to an adjacent heating mat and receive electrical power from the adjacent heating mat. Optionally, the three-dimensional structure is selected from a group comprising a dome and a corner.

Optionally, the heating mat is in a shape of a square, a rectangle, a triangle, or a hexagon.

In some embodiments, the heating mat further comprises a heat conducting, electrically isolating cover layer. Optionally, the cover layer is a lamination cover. Optionally, the cover layer comprises material selected from a group comprising: wood, ceramics, linoleum and combinations thereof.

In some embodiments, the heating mat further comprises a heat isolating under-layer.

In some embodiments, at least one of the sets of electrodes deposited on the substrate is deposited using deposition methods selected from a group comprising: printing, gluing, punching, placing and combinations thereof. In some embodiments, at least two of the sets of electrodes deposited on the substrate are deposited using deposition methods selected from a group comprising: printing, gluing, punching, placing and combinations thereof.

Optionally, manufacturing the heating mat comprises placing an electrical insulator between the sets of electrodes of different polarity in the at least one crossing point.

In some embodiments, the heating elements deposited on the substrate are deposited using a deposition method selected from a group comprising: printing, gluing, punching, placing and combinations thereof. Optionally, the deposition method comprises printing with a conductive ink using a printing method selected from a group comprising: painting, ink-jet printing, silk-screen printing and combinations thereof.

A radiation mat is disclosed, the radiation mat comprising a substrate having a rim, at least two sets of non-parallel electrodes of different polarities deposited on the substrate, and a plurality of radiation generating elements attached to said substrate. In the radiation mat, electrodes of same polarities are electrically connected to each other, and electrodes of different polarities are electrically isolated from each other cross each other in at least one crossing point. The radiation generating elements are connected to at least two electrodes of different polarities such that voltage applied between the electrodes of different polarities creates an electrical current in the radiation generating elements.

In some embodiments, the radiation generating elements radiate heat in response to the electrical current. In some embodiments, the radiation generating elements radiate Infra-Red radiation in response to said electrical current.

Optionally, the radiation mat radiating Infra-Red radiation is in a shape of a target such as a person, part of a person, a car, a vehicle, an airplane, or a tank.

In some embodiments, the radiation generating elements radiate visible light in response to the electrical current. Optionally, the radiation generating elements are selected from a group comprising: LED, OEL, EL and combinations thereof.

A heating fabric is disclosed, the heating fabric comprising:

a plurality of electrically conductive electrode fibers of first polarity woven to a fabric as warp and weft such that the warp electrode fibers of first polarity make electrical contact with the weft electrode fibers of first polarity;

a plurality of electrically conductive electrode fibers of second polarity woven to the fabric diagonally in first and second directions at substantially right angle such that the diagonal fibers in the first direction make electrical contact with diagonal fibers in the second direction, and are electrically isolated from the electrode fibers of first polarity; and a plurality of electrically resistive fibers woven to the fabric at least as warp or weft such that the electrically resistive fibers make electrical contact with the conductive electrode fibers of first and second polarities, and such that voltage applied between said electrodes of different polarities creates an electrical current in the electrically resistive fibers.

Optionally, in the heating fabric the plurality of electrically resistive fibers are woven to the fabric as warp and weft. Optionally, the electrical current in the electrically resistive fibers generates heat. Optionally, the heating fabric further comprises electrically non-conductive fibers.

Optionally, the electrical isolation between the electrode fibers of first polarity and the electrode fibers of second polarity is in a form of electrical insulation on at least one of the electrode fibers at the point of intersection of fibers of different polarities.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4B depicts a prior art heating mats resulting from trimming a prior art heating mat of FIG. 4A.

FIG. 9A schematically depicts a side view of a tubular heating string according to an exemplary embodiment of the current invention.

FIG. 9B schematically depicts a cross sectional view of a tubular heating string according to an exemplary embodiment of the current invention.

FIG. 9C schematically depicts enlarged view of a tubular heating string according to an exemplary embodiment of the current invention.

DETAILED DESCRIPTION OF THE SELECTED EMBODIMENTS

Figure 1:
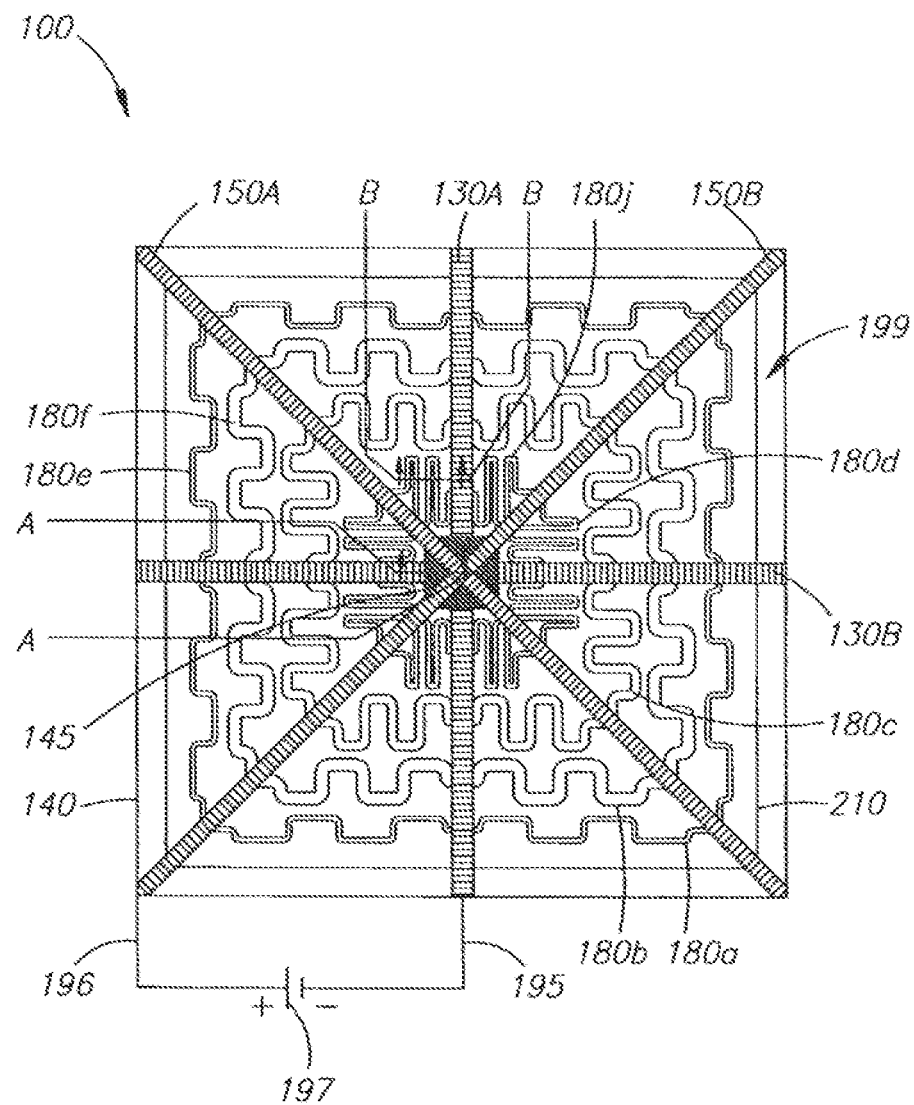
FIG. 1 schematically depicts an exemplary top view, showing layout of electrodes and heating elements of an adjustable heating mat according to an exemplary embodiment of the current invention.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The terms "comprises", "comprising", "includes", "including", and "having" together with their conjugates mean "including but not limited to".

The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements were omitted from some of the drawing.

Various embodiments of an adjustable electric heating mat are disclosed hereinbelow. Embodiments of adjustable heating mats comprise a configuration of electrodes that enables the mat to be cut without compromising the mat's ability to generate heat. Some embodiments are modular, enabling a plurality of mats to be assembled together into a large or complex-shaped heat-generating surface. The assembly of the mats does not require complex attachment means and procedures.

Some embodiments comprise a plurality of heating elements, a substrate upon which the heating elements are arranged, and two sets of non-parallel electrodes of opposing polarities. The heating elements are connected to at least one electrode of each polarity. Preferably, the heating elements are connected to a plurality of electrodes such that the heating system may be cut into shape without the heating elements being disconnected from the electrodes.

Reference is hereby made to the figures.

FIG. 1 schematically depicts an exemplary top view, showing layout of electrodes and heating elements of an adjustable heating mat 100 according to an exemplary embodiment of the current invention.

In preferred embodiments, the initial shape of the mat is rectangular, for example and without limitation a square. Mat 100 is preferably covered with electrical insulating layer 210 which is drawn herein transparent so electrode and heating elements would be seen.

A first set of electrodes may be comprised of two diagonal conductive strips 150A and 150B arranged in the form of an X and placed on top of the substrate 140.

A second set of electrodes may be comprised of another set of two orthogonal conductive strips 130A and 130B arranged in the form of a cross (+) at 45 degrees to the first set of electrodes.

The two sets of electrodes form an eight-point star, and are separated by a layer of insulating material 145 where they intersect, typically in the middle of the rectangular mat. The heating elements 180a, 180b, 180c, 180d, etc. (for drawing clarity only few of the plurality of heating elements are marked in the drawing) are arranged within the mat 100 such that each heating element 180i touches at least one of the electrodes 150A or 150B of the first set, and at least one of the electrode 130A, 130B of the second set.

The conductive strips 130A, 130B, 150A, 150B may be made of any conductive material that suits requirements, such as but not limited to copper, aluminum, silver, conductive alloys, conductive ink or the like. The substrate 140 may be a layer of plastic, or any other electrically insulating material which suits requirements. The heating elements may be made of resistive material such as Alumina, stainless steel, Iron, carbon or any other electrical resistive material.

Embodiments of the adjustable heating mat require that each heating element is attached to at least one electrode of positive polarity and at least one electrode of negative polarity. It should be noted that positive and negative polarity only refer to opposite electrical polarities, and that polarity may be reversed, or Alternating Current (AC) may be used.

The figure shows how the electrode strips may be connected to a power source 197. Electrode 150B is connected to a positive electric potential 196 whereas electrode 130A is connected to a complementary negative electric potential 195. It should be noted that electrode strips 150A, 150B of the first set are in direct contact with each other, thus electric potential applied to one strip 150A of the first set is also applied to the other strip 150B of the first set. Similarly, electrode strips 130A, 130B of the second set are in direct contact with each other, thus electric potential applied to one strip 130A is also applied to the other strip 130B of the second set.

Electric potential may be applied to the electrodes in a number of ways, such as via electricity cables plugged to an external power source, battery cells, inductive power units or the like.

It should be noted that according to an exemplary embodiment of the invention, heating elements 180 are made of material with electrical resistance higher than the electrode strips 150 and 130, such that voltage applied to the opposite electrode strips 150 and 130 causes heat to be generated in heating elements 180. In preferred embodiments, electrical properties of heating elements 180 are chosen such that heat generation is substantially evenly distributed over the surface of heating mat 100. This may be achieved by patterning the layer of heating elements 180. For example, equal thickness layer of resistive material may be used for heating elements 180, patterned with optional different width of strips, and optional bends and turns to obtain the desired length as depicted in the exemplary embodiment of FIG. 1. Additionally, or alternatively, different thickness of resistive material may be used for heating elements 180.

Mat 100 is preferably covered with electrical insulating layer 210 which is drawn herein transparent so electrode and heating elements would be seen. In the depicted exemplary embodiment, insulating layer 210 leave the ends of electrode stripes 130 and 150 exposed near the rim 199 of mat 100, such that electrodes of adjacent mats may be electrically connected, for example by applying a conductive tape.

Preferably, both substrate 140 and electrical insulating layer 210 are electrically insolating. In some exemplary embodiments the substrate is made of poor heat conductive material to direct the generated heat upwards, to the floor under which mat 100 is placed. In some exemplary embodiments electrical insulation layer 210 is made of good heat conductive material, or thin enough as not to impede conduction of the generated heat upwards, to the floor under which mat 100 is placed.

Figure 2A:
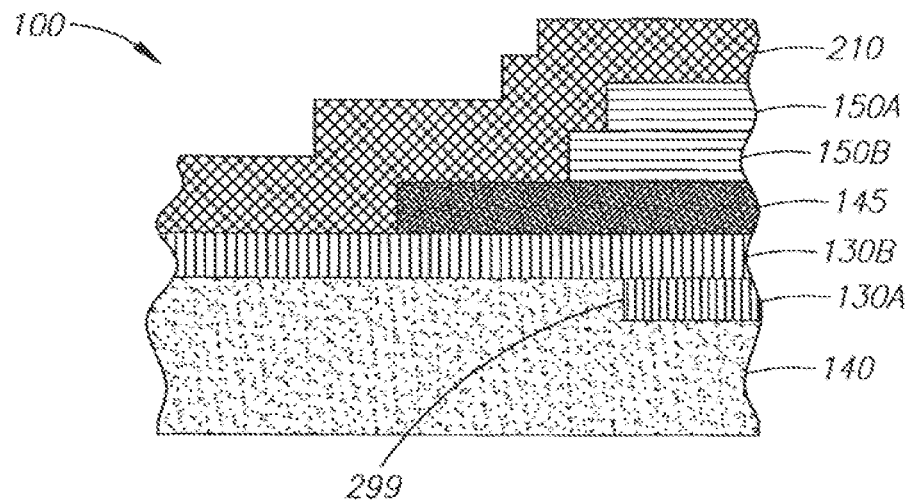
FIG. 2A schematically depicts a cross-section through the adjustable heating mat 100 along the A-A line depicted in FIG. 1 according to an exemplary embodiment of the current invention.

FIG. 2A schematically depicts a cross-section through the adjustable heating mat 100 along the A-A line depicted in FIG. 1 according to an exemplary embodiment of the current invention.

The entire structure rests on substrate 140, and covered by insulating layer 210 (removed in FIG. 1 to expose the electrodes and heating elements).

Line A-A starts at the left at the center of mat 100, at the intersection of electrode strips 150A, 150B 130A, and 130B.

Electrode strips 130A and 130B are seen herein in physical and electrical contact. In the depicted embodiment, electrode strip 130A is seen placed in an optional groove or a trench 299 in substrate 140.

Electrode strips 150A and 150B are seen herein in physical and electrical contact.

Electrode strips 150A and 150B are separated from electrode strips 130A and 130B by an electrically insulating layer 145.

It is apparent to a man skilled in the art that other sequence of layers may be different within the scope of the current invention. Similarly, joining or intersection of electrode strips 150 and 150B, may not coincide with joining or intersection of electrode strips 130A, and 130B. Similarly, pattern of groove 299 may be different of missing.

It should be noted that the order of layers, their relative positions and their parameters as depicted herein are to be viewed as a non-limiting example, and other configurations are possible within the scope of the current invention.

Figure 2B:
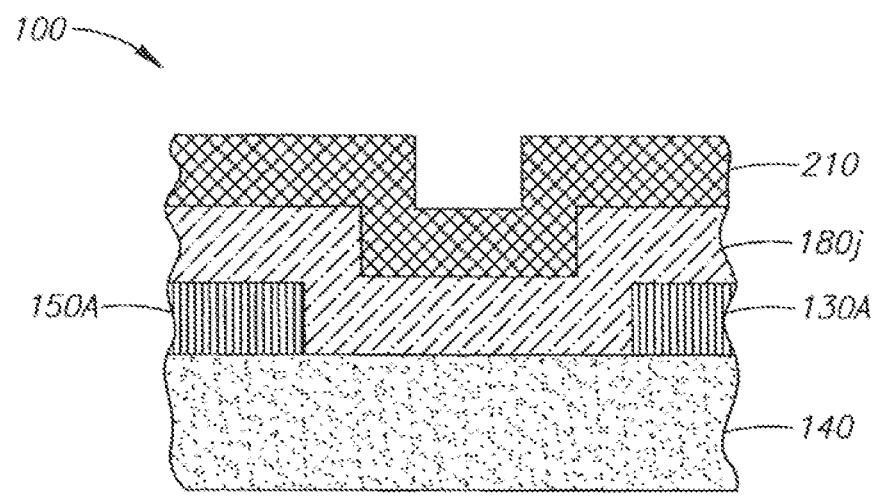
FIG. 2B schematically depicts a cross-section through the adjustable heating mat 100 along the B-B line depicted in FIG. 1 according to an exemplary embodiment of the current invention.

FIG. 2B schematically depicts a cross-section through the adjustable heating mat 100 along the B-B line depicted in FIG. 1 according to an exemplary embodiment of the current invention.

The entire structure rests on substrate 140, and covered by insulating layer 210 (removed in FIG. 1 to expose the electrodes and heating elements).

Line B-B is off center and intersects with electrode strips 130A, heating element 180*j*.

Electrode strips 130A and 150A are seen herein in physical and electrical contact with heating element 180*j*. For drawing clarity windings of heating element 180*j* depicted in FIG. 1 are not seen here.

The insulating layers such as 140, 145 and 210 may be constructed of Polyethylene or any other material which suits requirements.

It should be noted that the order of layers, their relative positions and their parameters as depicted herein are to be viewed as a non-limiting example, and other configurations are possible within the scope of the current invention.

It should be realized that a man skilled in the art of manufacturing may use a variety of manufacturing methods to make the heating devices depicted herein. Few such methods are disclosed herein as example.

a. Starting with a substrate layer, a pattern of heating elements may be deposited using methods such as: placing a plurality of heating elements on the substrate; printing the heating elements (using silk screen or ink jet printer or other method); or gluing already prepared pattern; or punching the pattern (for example using regular or rotary punch machine).

b. Next, the first layer of electrodes is deposited. This may be done by placing electrode strips in one direction and then in the other direction. Alternatively, a pattern of the first electrodes' layer may be deposited using methods used in step "a" above.

c. An electrical insulation layer is placed over the first layer of electrodes at the locations where first and second layers of electrodes are to overlap. Any of the methods used in "a" or "b" above may be used.

d. The second layer of electrodes (having opposite polarity as the first electrode layer) is deposited. This may be done using methods used in step "b" above.

e. Optionally a lamination layer is placed above the structure, foe example by placing an insulation membrane, or using any of the methods used in steps "a" above. The structure may optionally be cured or glued together, for example by applying glue, heat, pressure, UV light, or other methods known in the art.

It should be noted that step "a" need not be the first step, but may be performed anytime before the optional step "e". The only requirements are: that the two electrode layers will be electrically insulated from each other; and that heating elements will make electrical contact with electrodes of both first and second electrode layers.

In an additional, alternative or optional method of manufacturing, a pattern comprising at least parts, or the majority of electrode strips of the different polarities are deposited at the same deposition stage. Obviously, crossing points cannot be deposited as one layer deposition. In these embodiments, bridging patterns are deposited for connecting electrodes of same polarity which were left not connected in the previous stage. The bridging patterns are properly insulated from the electrodes of the opposite polarity.

It should be clear that in additional, alternative or optional method of manufacturing the bridge pattern (or patterns) may be deposited before the parts, or the majority of electrode strips of the different polarities are deposited.

In some embodiments, electrodes may be deposited on two opposing sides of a substrate or an insulation layer, or be separated by an insulation layer, and be connected to the heating elements of to electrodes of same polarity through holes or gaps in the insulation layer. For example conductive-filled via-holes such as used in printed circuitry may be used for connecting elements separated by insulating layer. Similarly, metallic rivets may be used.

Figure 2C:
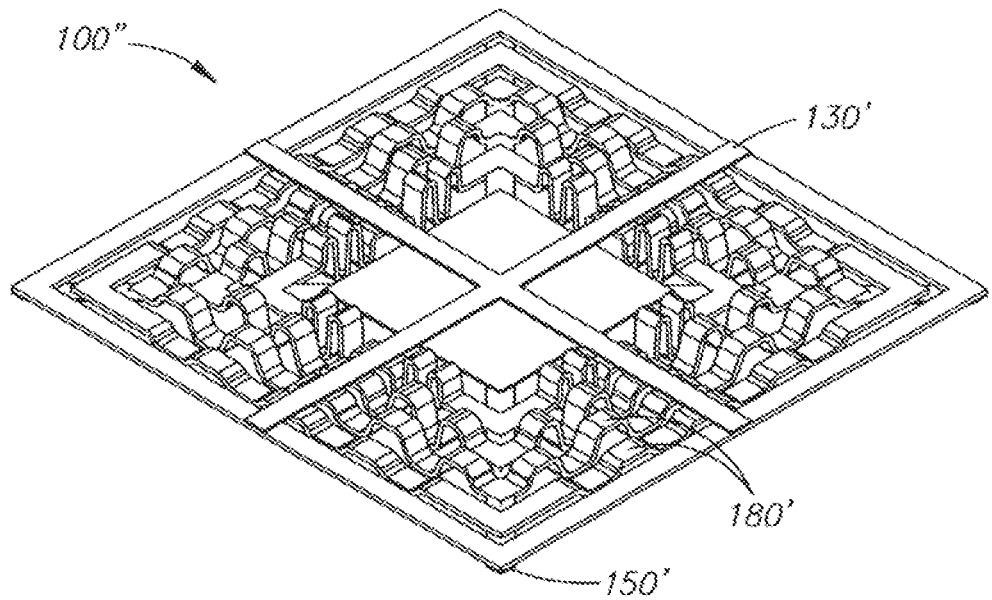
FIG. 2C schematically depicts a three dimensional embodiment for heating mat according to an exemplary embodiment of the current invention.

FIG. 2C schematically depicts a three dimensional embodiment for heating mat 100' according to an exemplary embodiment of the current invention.

The depicted embodiment shows the arrangement of the first set of electrodes which comprised of two diagonal conductive strips 150'.

The depicted embodiment shows the arrangement of the second set of electrodes which comprised of two orthogonal conductive strips 130' arranged in the form of a cross (+) at 45 degrees to the first set of electrodes.

The depicted embodiment further shows the arrangement of heating elements 180' arranged such that each heating element 180 touches one of the electrodes 150' of the first set, and one of the electrodes 130' of the second set.

Figure 2D:
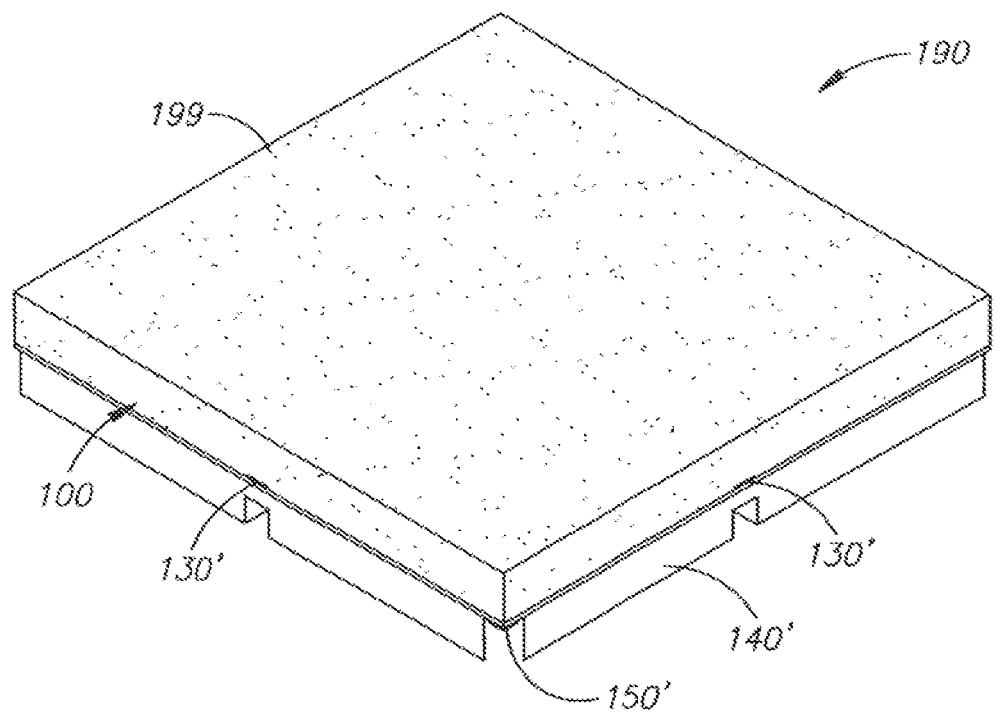
FIG. 2D schematically depicts a three dimensional embodiment for heating mat incorporated in a heating tile according to an exemplary embodiment of the current invention.

FIG. 2D schematically depicts a three dimensional embodiment for heating mat 100' incorporated in a heating tile 190 according to an exemplary embodiment of the current invention.

Heating tile 190 comprises a substrate 140' on top of which the three dimensional heating mat 100' is placed such that electrodes 130' and 150' are exposed at center of the edges and at the corners respectively. Top cover 198, made for example of ceramic, cement, wood or linoleum covers the heating mat.

Figure 3:
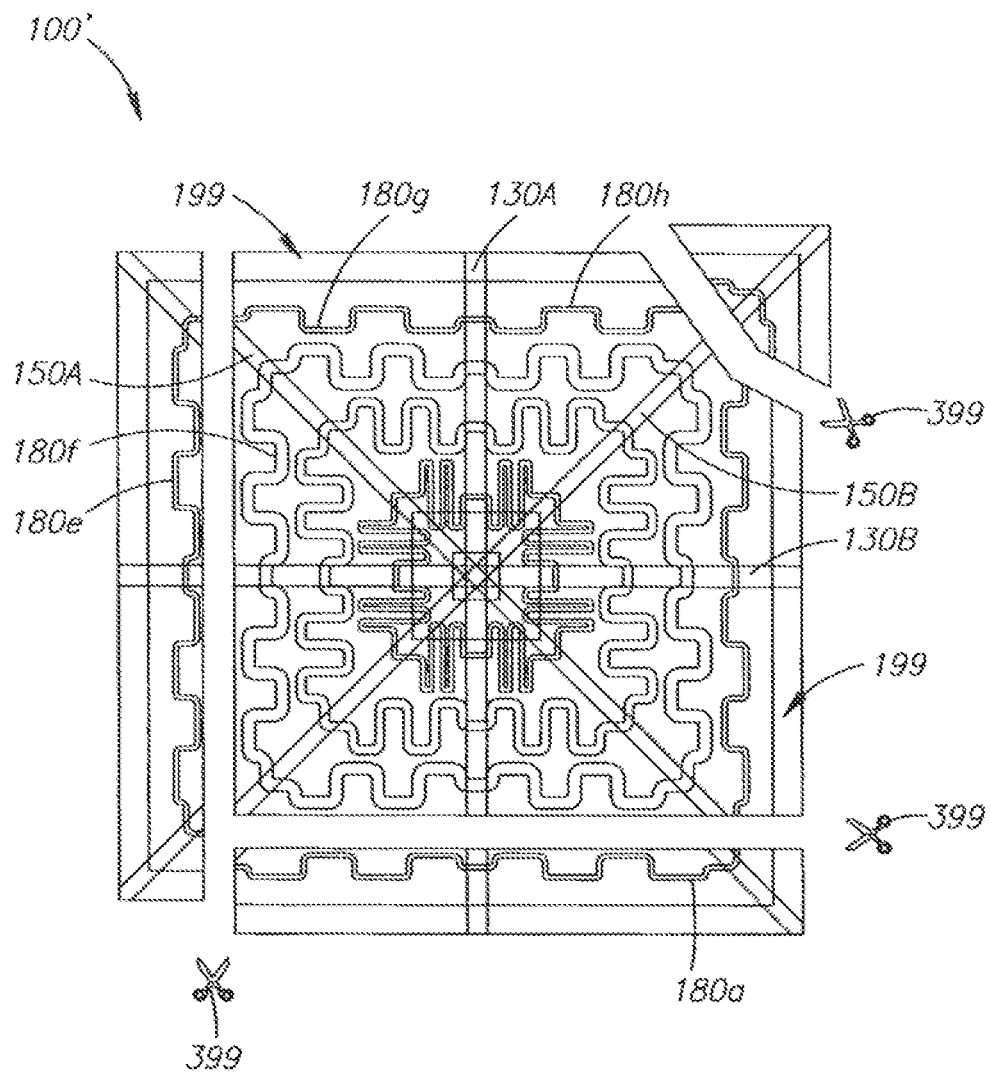
FIG. 3 schematically depicts an adjustable heating mat originally in the shape of a square (as shown in FIG. 1) after it was trimmed according to an FIG. 4A depicts a prior art heating mat.

Tiles 190 may be used for tiling a floor of a house or an office or other surfaces of structures or buildings. Corner electrodes and edge central electrodes make contact and provide power to the entire surface. As depicted in FIG. 3 below, tiles 190 may be trimmed to size, for example by sawing, cutting or drilling without loss of their heating properties.

FIG. 3 schematically depicts an adjustable heating mat 100' originally in the shape of a square (as shown in FIG. 1) after it was trimmed according to an exemplary embodiment of the current invention.

Starting with adjustable heating mat 100 with conductive material strips 130A and 130B having negative polarity and conductive strips 150A and 150B having positive polarity, the mat 100 has been trimmed on its left side and bottom side, and torn across its upper-right corner to arrive at trimmed mat 100'. It should be noted that the exemplary trimming depicted schematically by scissors 399 may take other forms within the scope of the current invention.

It will be appreciated that once cut or trimmed, the left side of the mat with heating element portion 180e is detached from the mat, as is the bottom side of the mat with heating element portion 180a, and the top right of the mat with a portion of heating element portion 180h.

Despite the cutting of the left hand side, heating elements 180g is still connected to the positive conductive strip 150A and the negative conductive strip 130A, and thus is still capable of generating heat. Similarly, all intact eating elements 180 remain functioning.

Moreover, ends of electrode strips remaining on untrimmed rims 199 of trimmed mat 100' are generally remained connected to the power.

Because of the tear on the upper right hand corner, heating element 180h is disconnected.

The above described example demonstrates the effectiveness of the arrangement of the electrode strips 130A, 130B, 150A and 150B within the heating mat 100, and shows how the mat's rims can be trimmed without compromising the effectiveness of most heating elements which remain within the mat.

FIG. 4A depicts a prior art heating mat 400.

Prior art heating mats 400 such as shown in such as shown in FIG. 4A typically comprise two electrode strips of opposing polarities 430 and 450 arranged parallel to each other and close to the rims 499 of the mat. The heating elements 480a, 480b, 480c, 480d and 480e range from one electrode strip 430 to the other electrode strip 450.

FIG. 4B depicts a prior art heating mats 400' resulting from trimming a prior art heating mat 400.

Cutting a prior art mat 400 to form a trimmed prior art mat 400' as shown in FIG. 4B would result in a tear 490 and the detachment of heating elements 480a and 48480b from electrode 450, thus rendering a large portion of mat 400' useless.

Additionally, cutting even a small section 499 from mat 400', interrupting the continuity of electrode strip 450, for example to fit mat 400' near a door lintel, may severely cripple the operation of trimmed mat 400'.

Assuming that power is supplied to the mat 400' by power source 197 (with terminals 195 and 195) from lower ends 439a and 459a of electrode strips 430 and 450 respectively, cut 499 renders heating elements 480a-c inoperative. Additionally, top end 459b of strip electrode 450 is now disconnected from power and thus cannot be used for transferring power to an adjacent mat placed adjacent to it.

Figure 5:
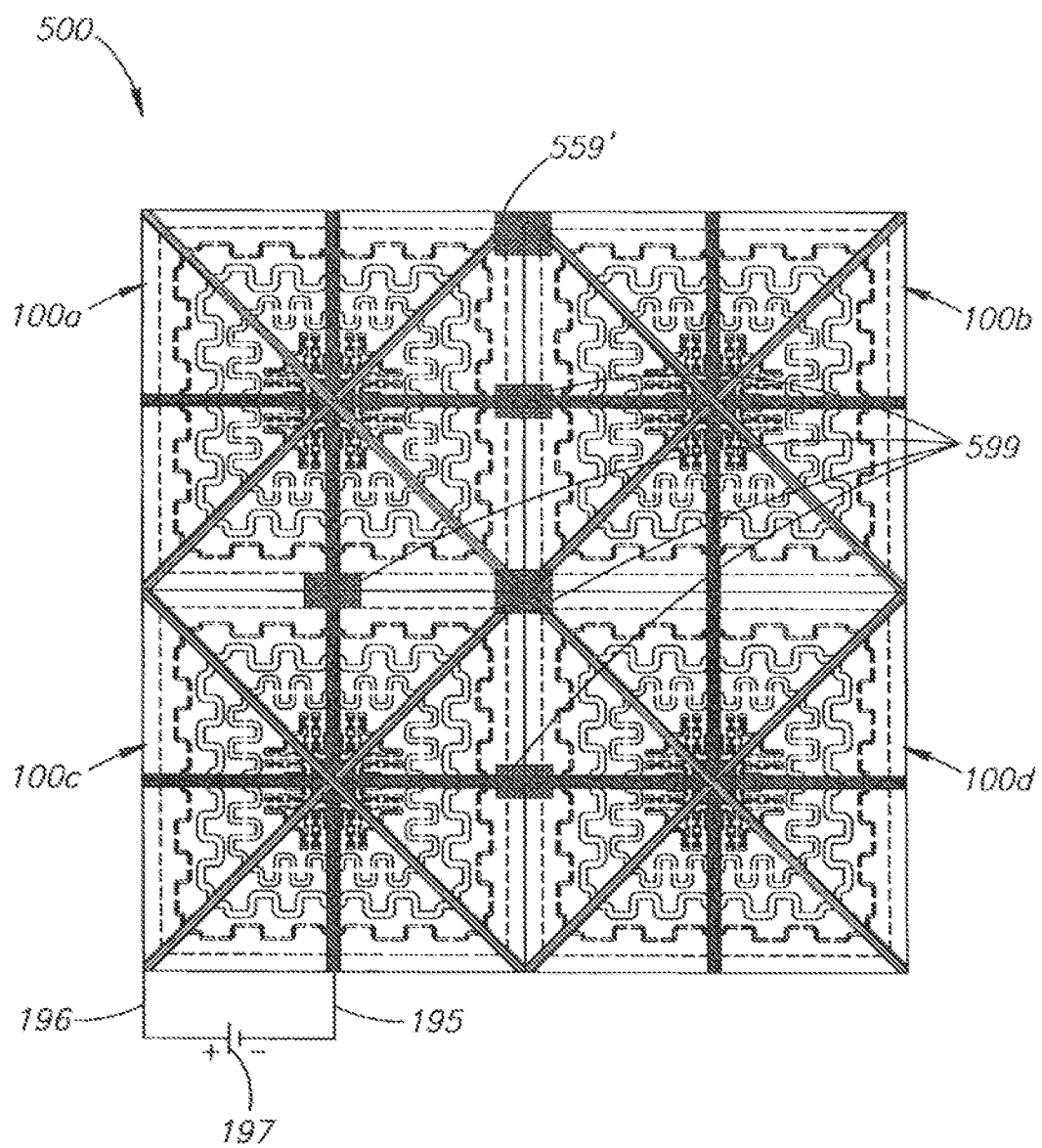
FIG. 5 schematically depicts tiling of a surface with a plurality of adjustable heating mats according to an exemplary embodiment of the current invention.

FIG. 5 schematically depicts tiling of a surface with a plurality of adjustable heating mats 100 according to an exemplary embodiment of the current invention.

FIG. 5 is schematically showing four square-shaped modules 100a, 100b, 100c and 100d of an adjustable heating mat (100 in FIG. 1) assembled together to form a larger heating surface 500. The electrodes of the four modules are typically connected to each other, such that the first set of electrodes of one module are connected to the first set of electrodes of its neighboring module and the second set of electrodes of one module are connected to the second set of electrodes of its neighboring module. Connectivity of the electrodes may be achieved by direct contact or by assembling conducting connecting means for example application of conductive tape patches 599 in contact with the adjacent electrode strips. Optionally, additional conductive tape patches such as 599' are used to create redundant paths for the supplied power and increase efficiency and reliability. Using this configuration, electric potential can be supplied to only one of the modules (100*c* in the depicted exemplary embodiment), and connectivity enables the electric potential to be distributed to all connected neighboring modules.

Any tile shape suited for tessellation may be suitable for applications requiring a plurality of heating mat modules. Examples may be seen in FIG. 6.

It should be noted that FIG. 5 shows the modular nature of an optional embodiment of mats 100 and an optional method of combining them for covering large areas. However, other methods of joining such modules or mats are possible within the scope of the current invention.

It also should be noted that heating surface 500 may be manufactured as a pre-integrated unit by repeating the structure of mat 100 in a one or two dimensional array. Optionally, a plurality of such arrays may be joined to cover even larger areas.

It is clear to see that heating surface 500 may be cut or trimmed as depicted in FIG. 3, while maintaining its heating properties even when the cutting or trimming extends over more than one mat 100.

Figure 6A:
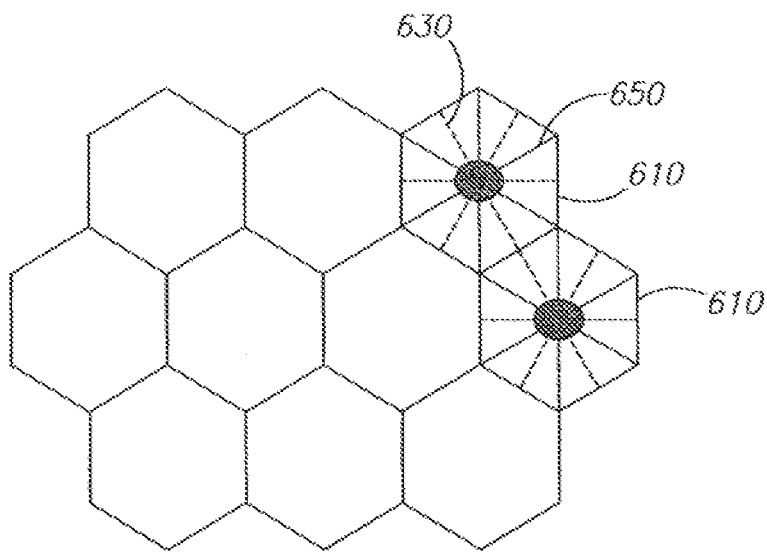
FIG. 6A schematically depicts hexagonal tiles according to an exemplary embodiment of the current invention.

FIG. 6A schematically depicts hexagonal tiles according to an exemplary embodiment of the current invention.

Hexagonal heating mats 610 can be used to tile a surface. A pattern of electrodes, insulators and heating elements on each tile 610 are used for transferring power from one hexagonal mat to the next and for heat generation.

For example, in hexagonal mat 610, electrodes of first polarity 650 are joined at the corners of hexagonal mats 610, while electrodes of second polarity 630 are joined at the center of the edges of hexagonal mats 610. For drawing clarity heating elements were omitted.

Figure 6B:
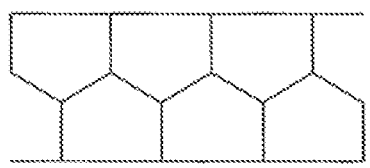
FIG. 6B schematically depicts square-based pentagons used as tiles according to an exemplary embodiment of the current invention.

FIG. 6B schematically depicts square-based pentagons used as tiles according to an exemplary embodiment of the current invention.

Figure 6C:
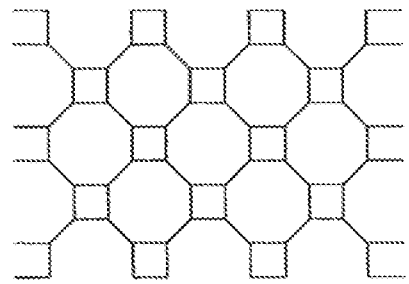
FIG. 6C schematically depicts tessellating combinations of tile shapes used as tiles according to an exemplary embodiment of the current invention, for example octagons and squares.

FIG. 6C schematically depicts tessellating combinations of tile shapes used as tiles according to an exemplary embodiment of the current invention, for example octagons and squares.

It should be noted that in some of these shapes and combinations thereof, special attention should be given to assembling multiple mats together, to ensure that the correct electrodes from the different mats are connected to each other. To this end, module connectors may be provided to ensure conductive coupling between neighboring modules of the mat.

The heating mats may be manufactured in various ways, such as printing upon a substrate, weaving conducting fabrics, etching conductors to a layer of insulating material or any other manufacturing means which suit requirements.

In one manufacturing method, a layer of substrate is used as a support. The first layer of conducting electrode is than deposited, for example by printing a pattern using conductive paint on the substrate. Ink-jet printer, silk printing or other printing technology may be used. Alternatively, prepared pattern of conductive strips or patterned conductive layers may be glued to the substrate.

An electrical insulation layer is affixed to the locations were electrodes of opposite polarity are overlaps. Insulation pattern may similarly be deposited, painted or glued.

Similarly, heating elements patterned layer is deposited, painted or glued.

It should be noted that order of layer placement may vary, as long as the electrical insulation layer is placed between the two opposing electrode layers.

Optionally, a top electrical insulation layer is deposited or glued on top of the electrical pattern.

Optionally the mat further comprises a thermal insulation layer below the support substrate. Optionally, the support substrate is made of thermal insulation.

In some embodiments, the mats are rigid.

In other embodiments the mats are made of flexible material.

Figure 6D:
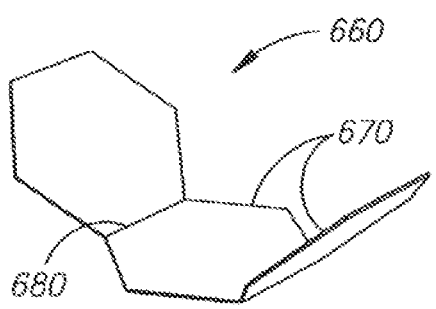
FIG. 6D schematically depicts a three dimensional structure created by joining a plurality of heating mats application according to an exemplary embodiment of the current invention.

FIG. 6D schematically depicts a three dimensional structure 660 created by joining a plurality of heating mats application 670 according to an exemplary embodiment of the current invention.

Three dimensional structures such as structure 660 may be created by joining modular mats 670 along their edges 680. Variety of types and shapes of mats may be used.

For example, the surface of a rectangular box may be tiled (from the inside or outside) using square or rectangular modular mats as seen in FIG. 1. Power may optionally be transferred from one mat to the other. Mats may optionally be trimmed before joining. Domes and other surfaces may also be covered.

Figure 7:
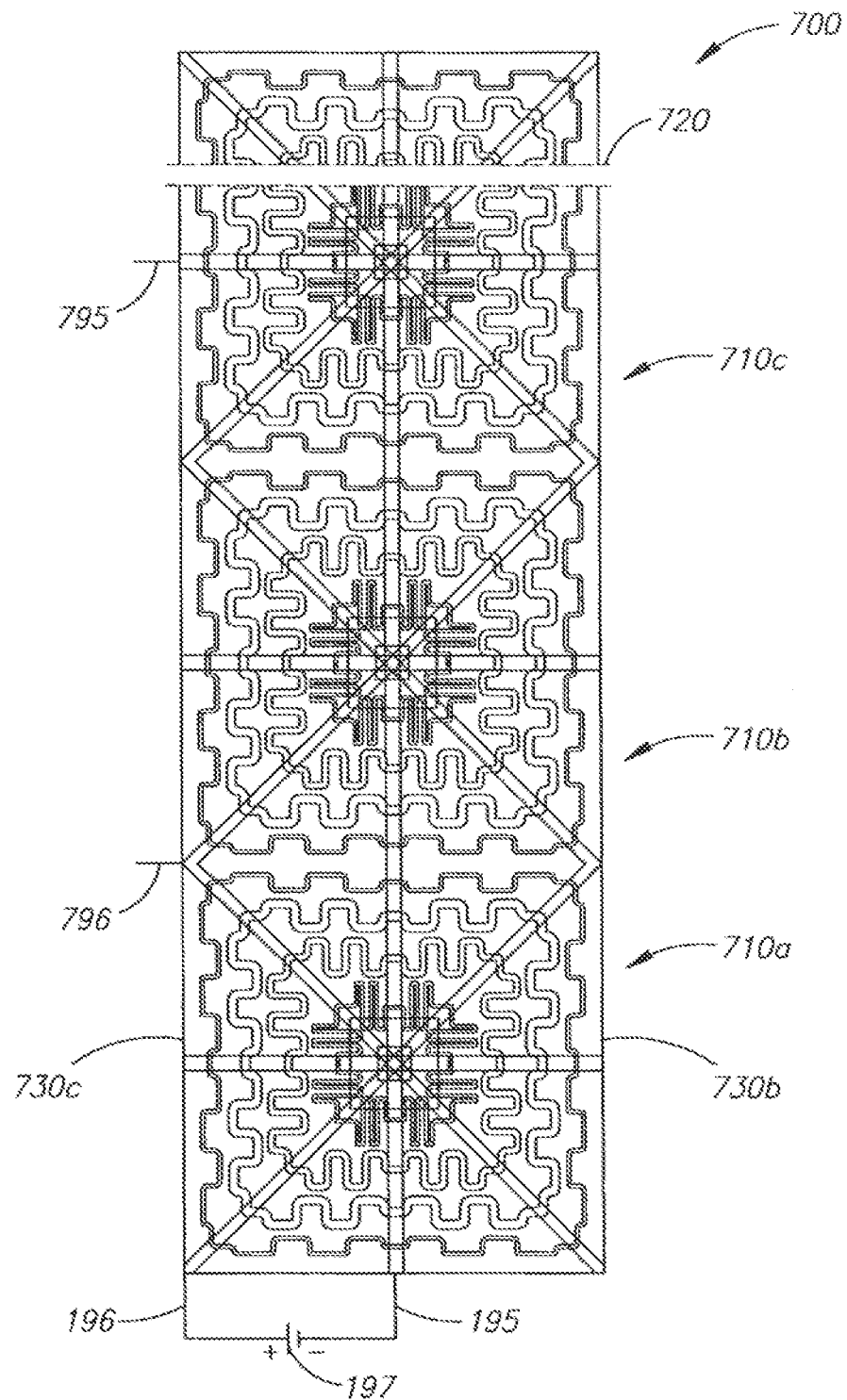
FIG. 7 schematically depicts a heating mat in a form of elongated heating strip according to an exemplary embodiment of the current invention.

FIG. 7 schematically depicts a heating mat in a form of elongated heating strip 700 according to an exemplary embodiment of the current invention.

Heating strip 700 comprises of repeating patterns 710 of electrodes and heating elements. Three such patterns are seen: 710*a*, 710*b*, 710*c*, but the strip may contain only two and preferably more than three patterns 710. Each pattern 710 is in form and function similar or identical to mat 100 already joined mechanically and electrically to the adjacent pattern.

Preferably, strip 700 is made of flexible materials and is brought rolled to the site where it is unfurled and cut to size, for example at dashed line 720.

Power may be supplied via connectors 195 and 196 connected to the electrodes for example at one of the ends 730*a*.

Additionally or alternatively, power may be supplied at one of the side edges 730*b* or 730*c* or at the cut end 720. For example, power may be supplied at locations 795 and 796 along the side edge 730*c*.

Large spaces may be covered with heating strips 700, for example placed side by side. It is clear to see that power mat be provided from the edges of the heating strips or may be provided from one heating strip to a strip placed near it by connecting electrodes of one strip to the next.

Similar to the situation depicted in FIG. 3, the strip 700 may tolerate cuts and maintain heating properties.

It should be noted that length of strip 700 is limited only by manufacturing and transport limitations, and strips may be cut to desired length or joined at narrow ends to extent the length. Similarly, strips may be joined along their long edges or at angles such as at right angel to extend beyond corners, etc. Power may be transferred from one strip to the next by bridging the electrodes of same polarity.

It should be noted also that the width of heating strip 700 may be selected according to the application. For example for housing or office floor, heating a width of 0.2 to 1.0 meter may be selected. Narrow strips may be selected for industrial applications. With modern manufacturing technology strips of large range of widths and lengths may be made.

It is clear to see that heating strip 700 may be cut or trimmed as depicted in FIG. 3, while maintaining its heating properties even when the cutting or trimming extends over more than one mat pattern 710.

Figure 8:
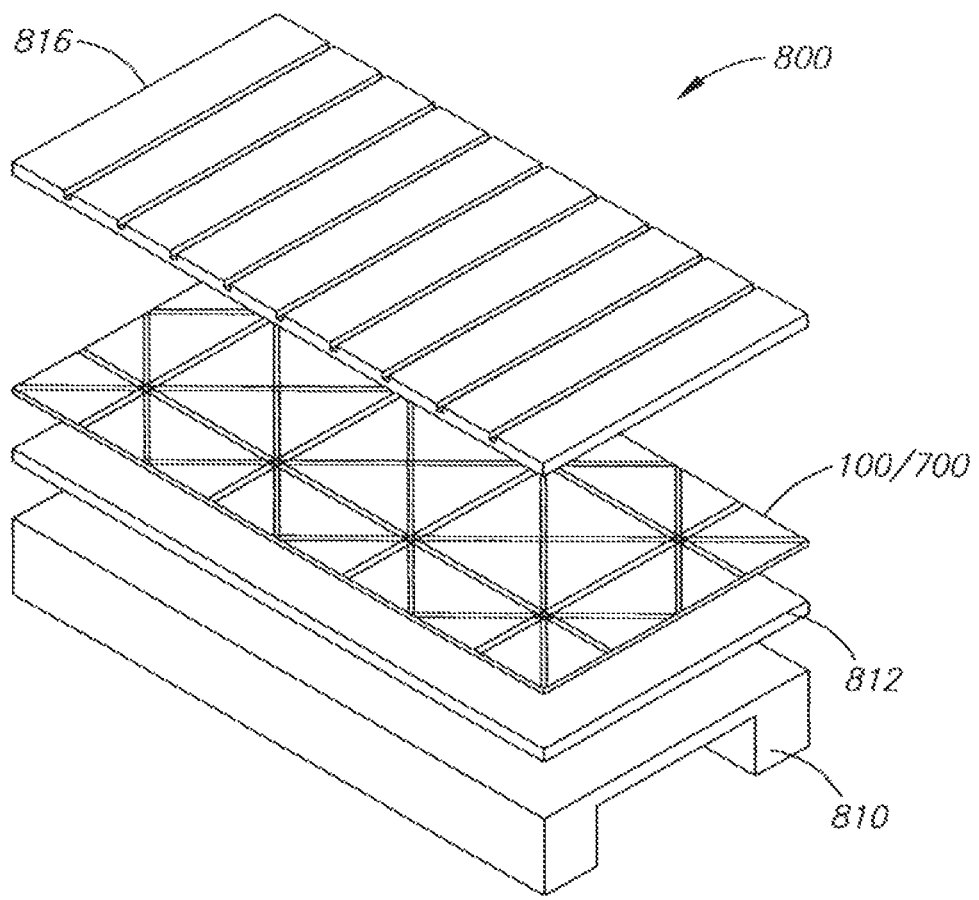
FIG. 8 schematically depicts typical application of heating mats such as mats and strips to floor heating according to an exemplary embodiment of the current invention.

FIG. 8 schematically depicts typical application of heating mats such as mats 100 and strips 700 to floor heating according to an exemplary embodiment of the current invention.

Heated floor 800 comprises a foundation 810 on it an optional thermal insulation layer 812 is placed. Heating mats 100 or strips 700 are placed on the optional thermal insulation layer 812 and are covered by flooring planks or flooring tiles 816.

Optionally, other layers may be added to the structure. For example, a radiation reflecting layer may be placed above the foundation 810 (above, below, or instead the optional insulation layer 812) to reflect heat carrying electromagnetic radiation towards the heated volume. Optionally other layer may be placed such as RF reflective or absorptive layer or moisture barrier layer etc.

Additionally, several heating layers or insulation layers may be printed, placed or glued on top of the other for increasing heating capabilities or improving insulation.

FIGS. 9A to 9C schematically depict a tubular heating string 900 according to an exemplary embodiment of the current invention.

FIG. 9A schematically depicts a side view of a tubular heating string 900 according to an exemplary embodiment of the current invention.

FIG. 9B schematically depicts a cross sectional view of a tubular heating string 900 according to an exemplary embodiment of the current invention.

FIG. 9C schematically depicts enlarged view of a tubular heating string 900 according to an exemplary embodiment of the current invention.

First type polarity electrodes 950 are patterned as longitudinal and transverse strips, while second polarity electrode is patterned as helical strip 930. For drawing clarity heating elements were omitted.

Alternatively, tubular heating string may be made by bending and joining long edges of a heating string 700. Alternatively, tubular heating string may be made by bending and joining long edges of a plurality of heating strings 700.

Tubular heating string may be used for heating elongated members such as tubes, beams or bars or internal volumes of pipes. Tubular heating string may be at a desired diameters and lengths.

It is clear to see that tubular heating string 900 may be cut to desired length, or trimmed, or perforated, or slit open while maintaining its heating properties as long as continuity of the electrodes 930 and 930 is maintained. Tubular heating string or sleeve 900 may be used for heating pipes and other elongated structures. In contrast to heating strips that need to be wrapped around the structure and needs to be secured to it, applying heating sleeve 900 is easy. The ability to trim and cut the sleeve without compromising its heating properties enables flexibility of its use. For example, a cut may be made to accommodate bends, elbows, valves, branches or other perturbation of a structure such as a pipe. For example a hole may be cut in sleeve 900 to allow connection of a sensor such as flow meter or pressure gage to a pipe.

The flexibility of embodiments depicted herein makes them suitable for use in situations such as chemical plants and laboratories.

Figure 10:
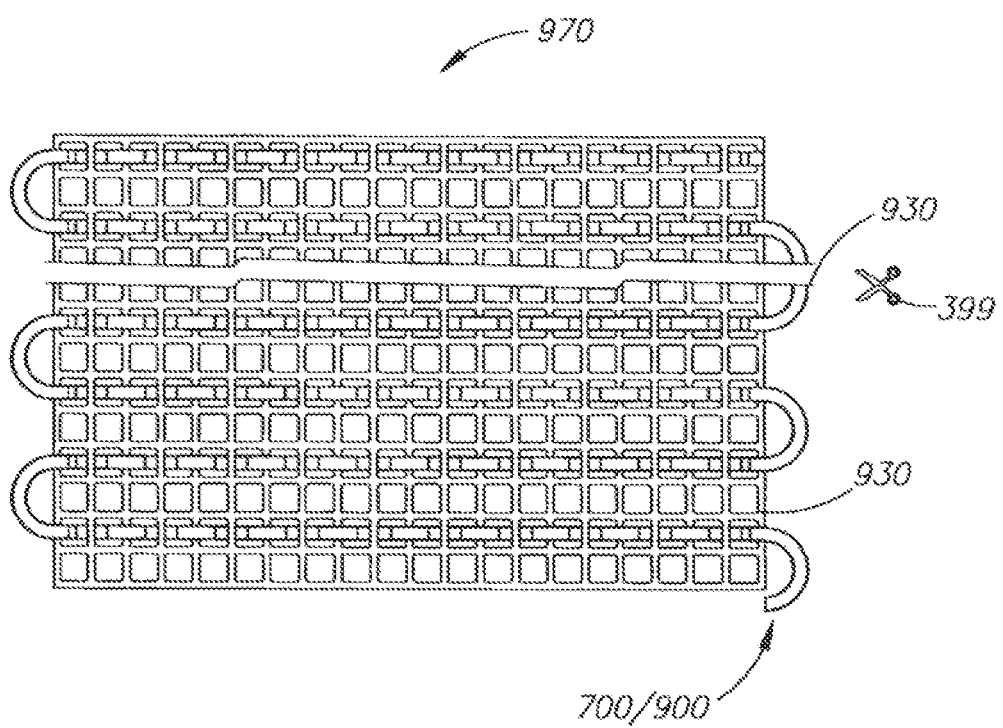
FIG. 10 schematically depict heating net according to an exemplary embodiment of the current invention.

FIG. 10 schematically depict heating net 970 according to an exemplary embodiment of the current invention.

Net 970 comprises a supporting matrix 972, for example a plastic net into which heating strip 700 or heating string 900 are weaved to create a large heating area, Heating net 970 may be cut 974 to length.

Such nets may be used on walls or ceilings and may be made to desired specifications be selecting the type of heating string or strips used, the density of the openings in the supporting matrix, and the way the heating string or strips are woven into the supporting matrix.

Figure 11:
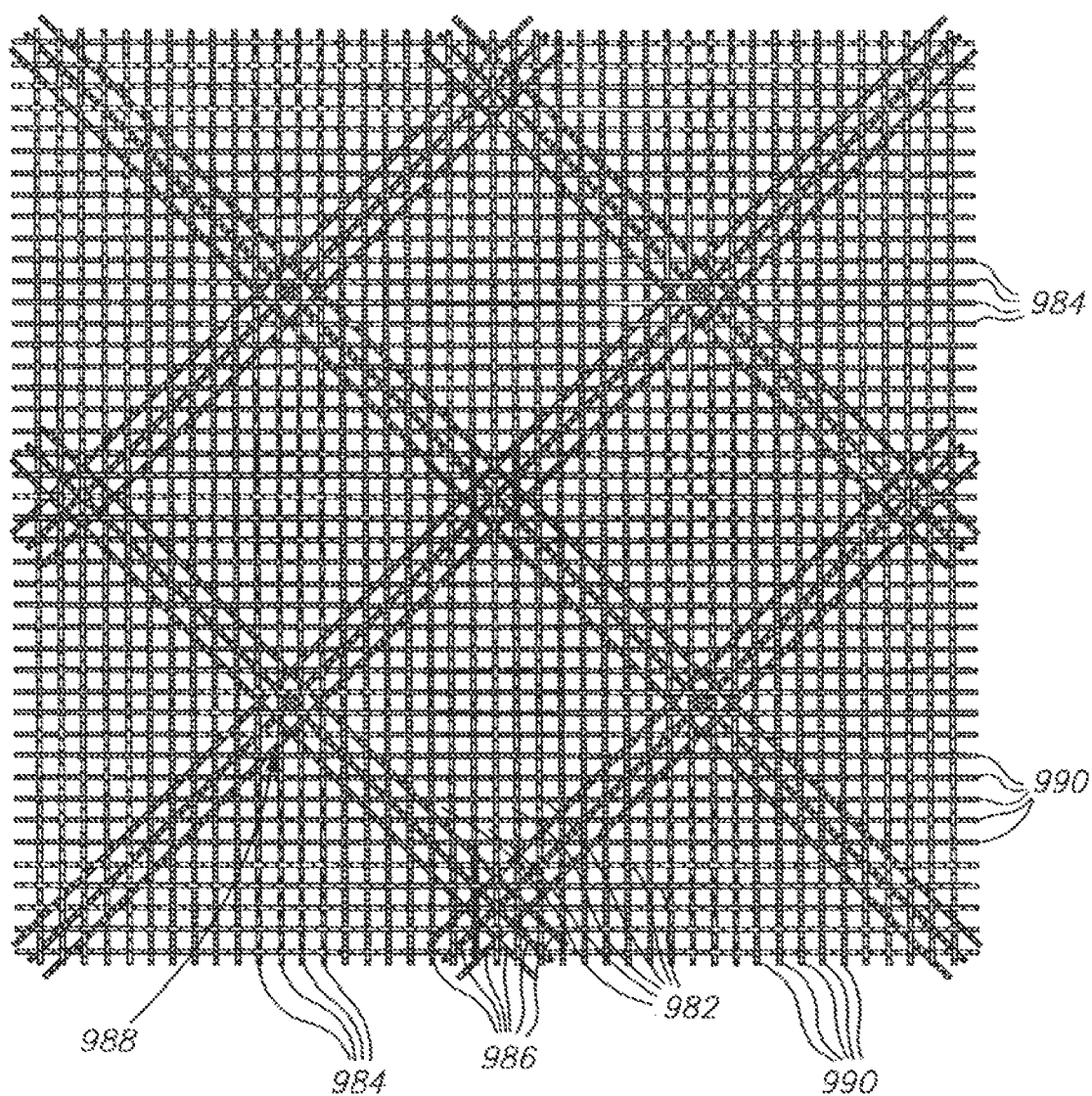
FIG. 11 schematically depict heating fabric according to an exemplary embodiment of the current invention.

FIG. 11 schematically depict heating fabric 980 according to an exemplary embodiment of the current invention.

Heating fabric 980 comprises of resistive fibers 982, for example carbon fibers or carbon coated polyester or any material that changes its electrical resistance with temperature or any material that generate heat or radiate heat when subjected to electrical current.

Further, heating fabric 980 comprises of first polarity electrode wires 984 and second polarity electrode wires 986 which make electric contact with resistive fibers 982, but are electrically insulated 988 where first polarity electrode wires 984 and second polarity electrode wires 986 overlap. In the depicted embodiment, first polarity electrode wires 984 are wived in a crisscross pattern, while second polarity electrode wires 986 are weaved diagonally.

Further, heating fabric 980 optionally comprises of structural electrically insulating fibers 990 which may give heating fabric 980 strength and keep resistive fibers 982, first polarity electrode wires 984 and second polarity electrode wires 986 in place.

It is clear to see that heating fabric 980 maintain its heating properties when cut to a desired size and pattern (including cutting holes in it) as long as electrical continuity of both first polarity electrode wires 984 and second polarity electrode wires 986 is maintained.

Other fabric patterns and weaving methods may be used. For example, the heating elements may be woven onto a fabric, and each set of electrodes may be attached to the top side and the bottom side of the fabric such that the two sets are isolated by a layer of insulating material.

It should be noted that the number of electrodes in each set of electrodes may vary in different embodiments, and that the first and second sets of electrodes may each comprise a different number of electrodes, for example and without limitation a heating mat wherein one set comprises four electrodes of one polarity and a second set comprises three electrodes of opposing polarity.

It should be further noted that the number of electrode sets may optionally vary to enable different electrical systems, such as but not limited to three-phase electric power systems having at least three conductors carrying voltage waveforms that are $2\pi/3$ radians (120°, ⅓ of a cycle in-phase) offset in time.

Embodiments of an adjustable electric heating mat may be used for a large variety of applications. One example discussed hereinabove is underfloor heating for houses, where the mats may be placed beneath the flooring or optionally integrated into the floor tiles.

Other embodiments may be applicable for military applications. One example could be creating human-shaped targets where heat seeking weaponry is involved. The mats may be shaped into the silhouette of a human target, allowing for effective search and rescue training.

Such mats may also be used for heating of animal cages, for example and without limitation iguana or other reptile cages, or heating animal beddings for dogs, cats or the like. Such mats may also be used for other heating surfaces and heating utensils, such as cooking, baking or food heating utensils. The mats may optionally be integrated with objects having unordinary shapes, such as clothing fabrics, therapeutic beds, bath tubs or the like.

The depicted embodiments may be used for radiation heating by replacing some or all the heating elements with Infra Red (IR) heaters.

In addition to heating, the depicted embodiments may be used for lighting by replacing some or all the heating elements with light generating elements such as Light Emitting Diodes (LED) or Organic Electro-Luminescence (OEL) or Electro-Luminescence (EL) elements. Lighting strips, mats, tubes and fabric may be used for providing light of different color and luminosity and applied to ceilings and walls.

It should be noted that heating or lighting cloth may be made in several ways within the scope of the current invention. For example, the heating or lighting cloth may be woven in several layers and than combined to form the complete structure.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An electrical heating mat comprising:
   a substrate;
   at least two sets of non parallel electrodes of different polarities deposited on said substrate,
      wherein electrodes of same polarities are electrically connected to each other, and electrodes of different polarities are electrically isolated them each other, and electrodes of different polarities cross each other in at least one crossing point; and
   a plurality of heating elements deposited on said substrate,
      wherein said heating elements are connected to at least two electrodes of different polarities such that voltage applied between said electrodes of different polarities creates an electrical current in said heating elements.

2. The heating mat of claim 1, wherein said electrodes and said heating elements are patterned to generate substantially uniform heat over the surface of said substrate when voltage is applied between said electrodes of different polarities.

3. The heating mat of claim 2, wherein said electrodes and said heating elements are patterned such that said mat may be substantially cut or trimmed, and wherein said heating elements generate substantially uniform heat over the remaining surface of said cut or trimmed substrate when voltage is applied between said electrodes of different polarities.

4. The heating mat of claim 3, wherein said electrodes and said heating elements are patterned in a form of repeated array.

5. The heating mat of claim 4, wherein said electrodes and said heating elements are patterned in a form of a repeated one-dimensional array such that the mat is in a form of an elongated strip having a first and is second narrow edges and a first and a second broad edges.

6. The heating mat of claim 5, wherein said elongated strip is capable of receiving electrical power sufficient for its operation from electrodes located on said first narrow edge.

7. The heating mat of claim 6, wherein said elongated strip is capable of transmitting electrical power to another such elongated strip from said second narrow edge.

8. The heating mat of claim 6, wherein said elongated, strip is capable of transmitting electrical power to another such elongated strip from any of said broad edges.

9. The heating mat of claim 5, wherein said substrate is in a form of an elongated tube having a first and a second ends.

10. The heating mat of claim 9, wherein said elongated tube is capable of receiving electrical power sufficient for its operation from electrodes located on said first narrow edge.

11. The heating mat of claim 4, wherein said electrodes and said heating elements are patterned in a form of repeated two-dimensional array.

12. The heating mat of claim 1 wherein:
   said substrate is in forms that can tile a flat surface, and having a rim; and
   said electrodes of different polarities are exposed at said rim of said substrate.

13. The heating mat of claim 12, wherein said mat is capable of being abutted to an adjacent heating mat and receive electrical power from said adjacent heating mat.

14. The heating mat of claim 1, wherein:
   said substrate is in forms that can tile a surface of a three-dimensional structure, and having a rim; and
   said electrodes of different polarities are exposed at said rim of said substrate.

15. The heating mat of claim 14, wherein said mat is capable of being abutted to an adjacent heating mat and receive electrical power from said adjacent heating mat.

16. The heating mat of claim 15, wherein said three-dimensional structure is selected from a group comprising: a dome and a corner.

17. The heating mat, of claim 1, wherein said mat is in a shape of a square, a rectangle, a triangle, or a hexagon.

18. The heating mat of claim 1, further comprising a heat conducting, electrically isolating cover layer.

19. The heating mat of claim 18, wherein said cover layer is a lamination cover.

20. The heating mat of claim 1. wherein said cover layer comprises material selected from a group comprising: wood, ceramics, linoleum and combinations thereof.

21. The beating mat of claim 1, further comprising a heat isolating under-layer.

22. The beating mat of claim 1, wherein at least one of said sets of electrodes deposited on said substrate are deposited using deposition methods selected from a group comprising: printing, gluing, punching, placing and combinations thereof.

23. The heating mat of claim 22, wherein said deposition method comprises printing with a conductive ink using a printing method selected from a group comprising: painting, inkjet printing, silk-screen printing and combinations thereof.

24. A radiation mat comprising:
   a substrate having a rim;
   at least two sets of non-parallel electrodes of different polarities deposited on said substrate,
      wherein electrodes of same polarities are electrically connected to each other, and electrodes of different polarities are electrically isolated from each other, and electrodes of different polarities cross each other in at least one crossing point; and
   a plurality of radiation generating elements attached to said substrate,
      wherein said radiation generating elements are connected to at least two electrodes of different polarities such that voltage applied between said electrodes of different polarities creates an electrical current in said radiation generating elements.

25. The radiation mat of claim 24, wherein said radiation generating elements radiate Infra-Red radiation or visible light in response to said electrical current.

26. The radiation mat of claim 25, wherein said radiation mat radiating Infra-Red radiation is in a shape at a target such as a person, part of a person, a car, a vehicle, an airplane, or a tank.

27. The heating radiation mat of claim 26, wherein said radiation generating elements are selected from a group comprising: LED, OEL, EL and combinations thereof.

* * * * *